US012771438B2

(12) United States Patent
Yedidia et al.

(10) Patent No.: US 12,771,438 B2
(45) Date of Patent: Oct. 20, 2026

(54) SYSTEM AND METHOD OF AUGMENTING TERRESTRIAL COMMUNICATION

(71) Applicant: COMMCRETE LTD, Sde David (IL)

(72) Inventors: Joshua Yedidia, Ramat Gan (IL); Itzik Daniel Michaeli, Sde David (IL); Michael Mor, Petah Tikva (IL)

(73) Assignee: COMMCRETE LTD, Sde David (IL)

( * ) Notice: Subject to any disclaimer, the term of this patent is extended or adjusted under 35 U.S.C. 154(b) by 307 days.

(21) Appl. No.: 18/508,526

(22) Filed: Nov. 14, 2023

(65) Prior Publication Data

US 2025/0158702 A1 May 15, 2025

(51) Int. Cl.
*H04B 7/185* (2006.01)

(52) U.S. Cl.
CPC ..... *H04B 7/18517* (2013.01); *H04B 7/18513* (2013.01)

(58) Field of Classification Search
CPC .............. H04B 7/18517; H04B 7/1851; H04B 7/18513; H04B 7/185; H04B 7/18528; H04B 7/18523
See application file for complete search history.

(56) References Cited

U.S. PATENT DOCUMENTS 6,104,925 A * 8/2000 Grube ................ H04B 7/18563 455/445
8,705,435 B1 * 4/2014 Godwin ................... H04B 1/40 370/324
8,988,291 B2 * 3/2015 Qi .......................... H01Q 21/29 343/702
2002/0177465 A1 11/2002 Robinett
2002/0193108 A1 * 12/2002 Robinett ............ H04B 7/18554 455/430
2003/0060195 A1 3/2003 Dent
(Continued)

FOREIGN PATENT DOCUMENTS

WO 99/21276 A1 4/1999

OTHER PUBLICATIONS (DE 202004005151 U1), Schneider, Device for Attaching Antennas to a Building, Jun. 2004, pp. 1-5 (Year: 2004).*
(Continued)

*Primary Examiner* — Keith Ferguson
(74) *Attorney, Agent, or Firm* — Whitestone Law, PLLC

(57) ABSTRACT

Examples include a communication converter including a RF signal port for coupling the communication converter to terrestrial RF transceiver, an antenna port for coupling the communication converter to a satellite antenna, a terrestrial-to-satellite (T/S) conversion unit configured to receive via the RF signal port terrestrial RF communication signals generated by the terrestrial RF transceiver and convert them into uplink satellite communication signals, a satellite-to-terrestrial (S/T) conversion unit configured to receive via the antenna port downlink satellite communication signals received by the satellite antenna and extract therefrom terrestrial RF communication signals thereby carried, and a detection unit configured to detect at least the reception of the terrestrial RF communication signals, and generate based thereon data/signals for setting mode of operation of the communication converter into a T/S mode or a S/T mode.

12 Claims, 6 Drawing Sheets

(56) References Cited

U.S. PATENT DOCUMENTS

| | | | |
|---|---|---|---|
| 2005/0181786 | A1 | 8/2005 | Karabinis et al. |
| 2008/0084838 | A1 | 4/2008 | Ryoo et al. |
| 2008/0218427 | A1 | 9/2008 | Dobosz et al. |

OTHER PUBLICATIONS

Commcrete Solid Communication Solutions Tactical Overview, https://commcrete.com/tactical/, pp. 1-3.

Commcrete Solid Communication Solutions Flipper—TS Series Overview, pp. 1-4.

* cited by examiner

SYSTEM AND METHOD OF AUGMENTING TERRESTRIAL COMMUNICATION

FIELD

The present invention is generally in the field of communication systems, and particularly relates to techniques of augmenting terrestrial communication equipment and infrastructures.

BACKGROUND

This section intends to provide background information concerning the present application, which is not necessarily prior art.

Conventional terrestrial radio transceivers (e.g., land mobile radio-LMR) operate within a defined radio frequency (RF) band, which is typically partitioned into multiple sub-bands defining various transmit/receive frequency ranges/channels for various RF applications (e.g., LMR, GSM, PCS). Geographic areas requiring RF communication coverage are typically divided into multiple cells, and a certain number of such channels is assigned to each geographic cell according to its traffic loads. When such conventional terrestrial radio transceivers are roaming from one geographic cell to another (i.e., mobile terrestrial radio transceivers), they usually change their communication channels in correspondence with the geographical division of the RF band.

The different frequency channel bands allocated to the geographic cells in RF communication systems are typically referred to as frequency plans (also referred to herein as terrestrial frequency plans). Accordingly, the conventional terrestrial radio transceivers are limited to the certain geographical cell in which the transceiver is being operated and to the specific frequency plan associated with the certain geographical cell. For example, LMR communication systems typically utilize communication channels that are 25 KHz wide in the low and high very-high-frequency (VHF) bands (30-50 MHz and 150-172 MHz), and in the ultra-high-frequency (UHF) band (450-512 MHz).

LMR communication systems (such as push-to-talk-PTT voice communication) are designed for extreme reliability in difficult environments, enabling instant communication between teams members, and thus they are a backbone necessity for operation of many civil, public, military, and government agencies. LMR communication can be conducted utilizing handheld, vehicle-mounted, and/or fixed base, radio transceivers, to provide users the ability to instantly communicate and coordinate efforts during routine and emergency operations, which is crucial for public safety protection and live saving operations (e.g., law enforcement, fire rescue, emergency medical services-EMS, and suchlike).

There are however various threats to LMR communication systems due to the ability to easily intercept their transmissions utilizing off-the-shelf commercially available equipment. There are also available devices that can be configured to act as LMR system users, giving them the ability to intercept and send messages. In addition, LMR communication systems are typically susceptible to deliberate and/or accidental interferences e.g., due to amateur/pirate deployment of RF equipment and/or regular electrical noise sources. The wide-spread and availability of web-based applications, frequency jammers, radio cloning devices, and encryption-breaking software can seriously challenge LMR communication systems. Though encryption can be used to implement secure LMR communication infrastructures, it is a complex, resource hungry, expensive to purchase and manage technology, which requires in-depth understanding and careful/persistent management.

The communication of conventional terrestrial RF systems is usually susceptible to the geographic conditions characterizing the geographical cells in which they operate. For example, communication between users is typically tampered when line-of-sight (LOS) between the antennas of the terrestrial RF transceivers, and/or with their relay/base station(s), is lost e.g., due to obstructions, such as terrain barriers/mountains, buildings, and/or rough weather conditions, or can be severely interfered due to RF reflections. There are currently no satisfactory solutions to the coverage, capacity and security, concerns associated with the conventional terrestrial RF communication, and their limiting frequency plans.

Some related solutions known from the patent literature are briefly described hereinbelow.

International Patent Publication No. WO 1999/21276 discloses a mobile radio for use in multiple different frequency plans. The multiple different frequency plans, such as land-based plans (cellular, land mobile radio, etc.) and satellite-based plans may employ different frequency bands and, within those different bands, different frequency channel step sizes. The mobile radio employs only a single loop synthesizer to accommodate all of the different plans, including all of the different channel step sizes. It does so by employing a dynamically programmable divider circuit within the single loop synthesizer for macro-adjustment of the local oscillator frequency and a dynamically adjustable reference oscillator within the single loop synthesizer for micro-adjustment of the local oscillator frequency depending upon a recovered carrier signal.

US Patent Publication No. 2008/218427 discloses a multiple mode communications transceiver which includes an antenna for receiving and transmitting RF energy and a first circuit selectively coupled to the antenna for transmitting and receiving FM modulated signals for terrestrial based communications. The transceiver also includes at least a second circuit selectively coupled to the antenna for transmitting and receiving satellite signals and a control circuit for selecting which of the first and second circuits are employed by the transceiver for the reception and transmission of information.

US Patent Publication No. 2003/060195 discloses a dual-mode telephone with a satellite communication adapter. According to one embodiment a cellular-type hand-portable phone is equipped with a connector for the attachment of accessories. This connector provides a satellite communications adapter accessory access to the handset's signal processing resources which may operate in an alternative mode to process signals received from the satellite and converted by the adapter into a suitable form for processing. The processing translates the satellite signals into voice or data, and vice-versa.

SUMMARY

Terrestrial RF communication systems have limited coverage and capacity, and their security can be easily breached, allowing unauthorized users to easily intercept and interfere the RF communications, and/or impersonate authorized participants. The increased availability of relatively inexpensive RF equipment nowadays imposes serious threats to management of critical mission operations and routine public safety operations, which primarily rely on types of instant terrestrial RF communication infrastructures, such as LMR/PTT RF communication.

The present application provides techniques for augmenting terrestrial RF communication equipment and infrastructures, and easily enabling to increase its capacity, coverage and security. In a broad aspect these goals are achieved in embodiments disclosed herein by relaying the conventional terrestrial RF communication over satellite communication channels e.g., utilizing geostationary communication satellites. In this way, the limited geographical coverage of conventional RF communication equipment/infrastructures can be increased up to the full geographical coverage of the satellite and/or its spot beam(s), the capacity of conventional RF communication systems can be greatly increased up to the limits of the satellite communication system used, and the security of the RF communication is also increased as satellite communication is more difficult to intercept and tamper with.

These and other objects of this disclosure are achieved in some embodiments by coupling the conventional terrestrial RF communication devices/equipment to a communication converter configured, in the transmit path, to receive the RF transmission generated by the RF communication devices/equipment and transmit it over a satellite uplink communication carrier to a satellite responder, and in the receive path receive over a downlink satellite carrier the RF transmissions conducted in the system.

The communication converter utilizes a terrestrial-to-satellite (T/S) communication converting unit configured to receive the terrestrial RF communication signals generated by a conventional terrestrial RF transceiver coupled thereto and relay it over a satellite uplink communication carrier to a satellite responder, and a satellite-to-terrestrial (S/T) communication converting unit configured to receive downlink satellite communication and extract therefrom terrestrial RF communication signals thereby relayed. For this purpose, the disclosed communication converter is equipped in some embodiments with a RF signal port configured for coupling of the terrestrial RF communication signals from the conventional terrestrial RF transceiver thereinto for relay over the satellite carrier by the T/S unit, a satellite antenna configured for transmission of the modulated uplink satellite carrier used by the T/S unit and for receiving the downlink satellite transmissions for extracting by the S/T unit the terrestrial RF communication signals thereby carried.

In possible embodiments the terrestrial RF transceiver is a type of push-to-talk (e.g., handheld/LMR) radio device. Embodiments hereof accordingly configured to provide PTT radio super smart satellite frequency converter seamlessly implementing the T/S and S/T functionalities utilizing the satellite antenna, so as to provide transparent functionality allowing keeping all PTT radio (e.g., modulation, coding, encryption, etc.) parameters the same. The disclosed embodiments can be configured to support all line-of-sight (LOS) PTT frequencies in the 50-950 MHz radio range, and/or all analog and digital constant envelope modulations, such as, but not limited to, FM, NXDN, P25, Tetra, DMR, ANDVT, CSVD (12K/16K), and suchlike.

The conventional satellite communication equipment available nowadays is typical configured to occupy the satellite communication channel(s) thereby used upon activation and throughout the entire communication i.e., other satellite communication device cannot use the satellite communication channel(s) for substantial long time periods. In embodiments hereof, the use of the satellite transmission channel/path of the communication converter is configured to optimize exploitation of the satellite communication channel(s) for allowing many users of the communication system to transmit and broadcast only when it is needed. This optimization of the satellite communication channel(s) is achieved by activating the satellite transmission channel/path of the communication converter for satellite transmission only when the terrestrial RF communication signals are received from the conventional terrestrial RF transceiver (i.e., only in the PTT mode), such that the satellite communication channel(s) is kept available and unoccupied for use by all other satellite devices in the system.

Optionally, but in some embodiments preferably, the disclosed communication converter further includes a detection unit configured to identify transmission of terrestrial RF communication signals from the conventional terrestrial RF transceiver and generate data/signals indicative thereof, and/or identify reception of the downlink satellite carrier and generate data/signals indicative thereof. The communication converter can be accordingly configured to change its mode of operations between the T/S and S/T modes, based on the data/signals generated by the detection unit. The communication converter and its detection unit this way can be configured to provide smart detection and rapid switching between transmission and reception modes, as will described hereinbelow in detail.

For example, the communication converter comprises in some embodiments a first switch device configured to controllably convey the terrestrial RF communication signals from the conventional terrestrial RF transceiver to the T/S unit based on data/signals generated by the detection unit indicative of the T/S mode of operation, or to convey the terrestrial RF communication signals extracted by S/T unit to the conventional terrestrial RF transceiver based on data/signals generated by the detection unit indicative of the S/T mode. A second switch device can be similarly used in the communication converter to controllably convey the satellite uplink communication signals generated by the T/S unit for transmission by the satellite antenna based on data/signals generated by the detection unit indicative of the T/S mode of operation, or to convey the satellite downlink communication signals received by the satellite antenna to the S/T unit based on data/signals generated by the detection unit indicative of the S/T mode.

A control unit is used in some embodiments to change the operating mode of the communication converter between the T/S and S/T modes. Namely, the control unit can be configured to set the states of the first and second switches based on the data/signals indications generated by the detection unit, and/or to operate the T/S and S/T units accordingly. One or more signal generators may be used for generating local oscillator signals for the uplink satellite communication signal generated by the T/S unit and for the extraction/demodulation of the terrestrial RF communication signals by the S/T unit. In some embodiments a single signal generator is used to controllably generate the local oscillator signals based on the data/signals generated by the detection unit and/or control signals generated by the control unit i.e., responsive to setting the communication converter into the T/S or S/T operation mode.

Optionally, but in some embodiments preferably, the control unit is further configured to instruct the signal generator to use a first frequency (also referred to herein as conversion frequency) for local oscillator signal thereby generated for the uplink satellite communication signal generated by the T/S unit, and to use a second frequency (also referred to herein as extraction frequency) for the local oscillator signal thereby generated for the extraction/demodulation of the terrestrial RF communication signals by the S/T unit. A memory is used in some embodiments in the communication converter to store one or more pairs of such first and second frequencies for generation of the local oscillator signals. The control unit can be accordingly configured to select a suitable pair of frequencies from the one or more frequency pairs stored in the memory, for use by the signal generator in the T/S and S/T operation modes based on geographical location of the terrestrial RF transceiver to which the communication converter is coupled i.e., based on the frequency plan of the terrestrial RF transceiver and/or satellite spot beam coverage of the satellite used to augment the terrestrial RF communication.

In one aspect the present application is directed to a communication converter comprising a terrestrial-to-satellite (T/S) conversion unit configured to receive and convert terrestrial RF communication signals into uplink satellite communication signals, and to receive downlink satellite communication signals and extract therefrom terrestrial RF communication signals thereby carried. The communication converter comprises in some embodiments one or more signal generators configured to generate local oscillator signals for the conversion of the terrestrial RF communication signals into the uplink satellite communication signals, and for the extraction of the terrestrial RF communication signals from the downlink satellite communication signals. The terrestrial-to-satellite (T/S) conversion unit is configured in some embodiments to modulate a local oscillator signal generated by the one or more signal generators with the terrestrial RF communication signals received by the communication converter. In possible embodiments the communication converter comprises a satellite-to terrestrial (S/T) conversion unit configured to use a local oscillator signal generated by the one or more signal generators to extract the terrestrial RF communication signals from the downlink satellite communication signals received by the communication converter.

A detection unit is used in the communication converter according to possible embodiments to detect the reception of the terrestrial RF communication signals, or of the downlink satellite communication signals, and generate data/signals indicative thereof. The communication converter can be configured to change mode of operation thereof between a T/S and S/T modes based on the data/signals generated by the detection unit. The communication converter can thus comprise a first switch device for coupling the communication converter to a terrestrial RF transceiver. The first switch device can be configured to controllably convey to the T/S conversion unit terrestrial RF communication signals received from the terrestrial RF transceiver, or to convey to the terrestrial RF transceiver terrestrial RF communication signals extracted by the S/T conversion unit.

The communication converter can be configured to use a second switch device for coupling the communication converter to a satellite antenna. The second switch device can be configured to controllably convey to the S/T conversion unit downlink satellite communication signals received from the satellite antenna, or to convey to the terrestrial satellite antenna uplink satellite communication signals generated by the T/S conversion unit.

The communication converter comprises in some embodiments a control unit configured to set the communication converter into the T/S or S/T modes of operation based on the data/signals generated by the detection unit. The control unit can be configured to generate control data/signals for changing the states of the first and second switch devices in accordance with the mode of operation indicated by the data/signals generated by the detection unit.

The control unit can be further configured to instruct the one or more signal generators to use a predefine extraction/demodulation frequency for generation of a local oscillator signal usable to extract the terrestrial RF communication signals from the downlink satellite communication signals, and to use a predefined conversion frequency for generation of a local oscillator signal usable for modulation of the terrestrial RF communication signals received by the communication converter from the terrestrial RF transceiver for generating the satellite uplink communication signals. In possible embodiments the communication converter comprises one or more memories for at least storing the predefined conversion and extraction frequencies. The communication converter may have a plurality of frequency pairs of predefined conversion and extraction frequencies. The control unit can be configured to select one of the plurality of frequency pairs for the generation of the local oscillation signal by the one or more signal generators based at least in part on a geographical location of the terrestrial RF transceiver to which the communication converter is coupled.

The communication converter comprises in some embodiments a power terminal connectable to a power source of said communication converter.

In another aspect the present application is directed to a communication device comprising a (e.g., PTT LMR) terrestrial RF transceiver, a communication converter according to any one of the embodiments disclosed hereinabove or hereinbelow configured to receive terrestrial RF communication signals generated by the terrestrial RF transceiver, and a satellite antenna configured to transmit satellite communication signals generated by the communication converter. The communication converter is coupled in some embodiments to the terrestrial RF transceiver via a waveguiding element (e.g., a coax cable) configured to connect to an antenna port of the terrestrial RF transceiver. Optionally, the communication converter is embedded inside the terrestrial RF transceiver.

The communication device comprises in some embodiments an extension pole configured to connect between the satellite antenna and the communication converter so as to elevate the satellite antenna a predefined distance from the communication converter, for improved downlink and uplink satellite communication. Optionally, but in some embodiments preferably, the satellite antenna is implemented by a type of small omni-directional passive antenna with modified ground plane, configured to optimize the gain to the satellite communication. It is noted that with this configuration of the satellite antenna there is no need to aim the satellite antenna in any particular direction for the conducting the satellite communication, as typically required due to the special ground plane engineering. The link margin achievable with such satellite antenna configuration is in the range of 12 to 16 dBs, depending on specifications of the satellite Tx/Rx communication and the radio waveform thereby used.

The satellite antenna can be a planar passive antenna. In some embodiments the satellite antenna is a type of printed circuit antenna. For example, the satellite antenna can be a type of right-hand circular polarity (RHCP) antenna, or a type of left-hand circular polarity (LHCP) antenna, depending on the GEO satellites used (RHCP for Inmarsat & LHCP for Thuraya).

In yet another aspect the present application is directed to a communication system comprising at least one satellite transponder, and at least two terrestrial RF transceivers having same terrestrial frequency plan and at least two communication converters according to any one of the embodiments disclosed hereinabove or hereinbelow operatively coupled to the at least two terrestrial RF transceivers respectively, and configured to communicate via the at least one satellite transponder, and/or at least two communication devices according to any one of the embodiments disclosed hereinabove or hereinbelow having the same terrestrial frequency plan and configured to communicate via the at least one satellite transponder, for relaying terrestrial RF communication therebetween over the at least one satellite transponder.

Optionally, but in some embodiments preferably, the at least one transponder is mounted on at least one geostationary satellite. Such embodiments thus enable implementation of bent-pipe satellite communication principle e.g., no need for registration, no air-time billing, no identification of end users (i.e., just using satellite bandwidth leased from the satellite provider).

The at least two terrestrial RF transceivers and/or the at least two communication devices can be located within a geographical region associated with a spot beam of the at least one satellite transponder. Optionally, but in some embodiments preferably, the geographical region contains a geographical cell associated with the same frequency plan of the at least two terrestrial RF transceivers and/or of the at least two communication devices. At least one of the at least two terrestrial RF transceivers, and/or of the at least two communication devices, can be located in another geographical region associated with either another spot beam of the at least one satellite transponder or with a spot beam of another satellite transponder that is in satellite communication with the at least one satellite transponder. In possible embodiments the another geographical region is remote from, or nearby to, or at least partially overlap with, a geographical cell associated with the same frequency plan of the at least two terrestrial RF transceivers and/or of the at least two communication devices.

According to yet another aspect the present application is directed to a method of augmenting terrestrial communication. The method comprising receiving a terrestrial RF communication signal from a terrestrial RF transceiver operating with a certain frequency plan, modulating an uplink satellite communication signal with the terrestrial RF communication signal, transmitting the modulated uplink satellite communication signal to a satellite transponder, extracting the terrestrial RF communication signal by the satellite transponder, modulating a downlink satellite communication signal with the extracted terrestrial RF communication signal, and transmitting the modulated downlink satellite communication signal by the satellite transponder to one or more other terrestrial RF transceivers operating with said certain frequency plan.

The method comprises in possible embodiments extracting from the modulated downlink satellite communication signal the terrestrial RF communication signal. The method comprising in some embodiments conveying the extracted terrestrial RF communication signal to the one or more other terrestrial RF transceivers.

The method may comprise using one communication converter to receive the terrestrial RF communication signal from one terrestrial RF transceiver, modulate the uplink satellite communication signal by the terrestrial RF communication signal and transmit it to the satellite transponder, and using one or more other communication converters to receive the modulated downlink satellite communication signal, extract therefrom the terrestrial RF communication signal, and convey the extracted terrestrial RF communication signal to the one or more other terrestrial RF transceivers.

The method comprises in some embodiments configuring the one communication converter and/or the one or more other communication converters to use a certain terrestrial communication plan, and/or a certain uplink satellite communication frequency associated with a satellite transponder, and/or a certain downlink satellite communication frequency associated with a satellite transponder. The configuring is based in some embodiments on a geographical position of the one terrestrial RF transceiver and/or of the one or more other terrestrial RF transceiver.

The method comprises in some embodiments sampling an antenna port of a terrestrial transceiver and continuously extracting from the modulated downlink satellite communication signal the terrestrial RF communication and conveying the same to the terrestrial transceiver, until the sampling is indicative of transmission of terrestrial communication signals by the terrestrial transceiver. Optionally, but in some embodiments preferably, the modulating of the uplink satellite communication signal and the transmitting of the modulated uplink satellite communication signal is carried out when the sampling is indicative of transmission of terrestrial communication signals by the terrestrial transceiver.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which.

DETAILED DESCRIPTION

Figure 1:
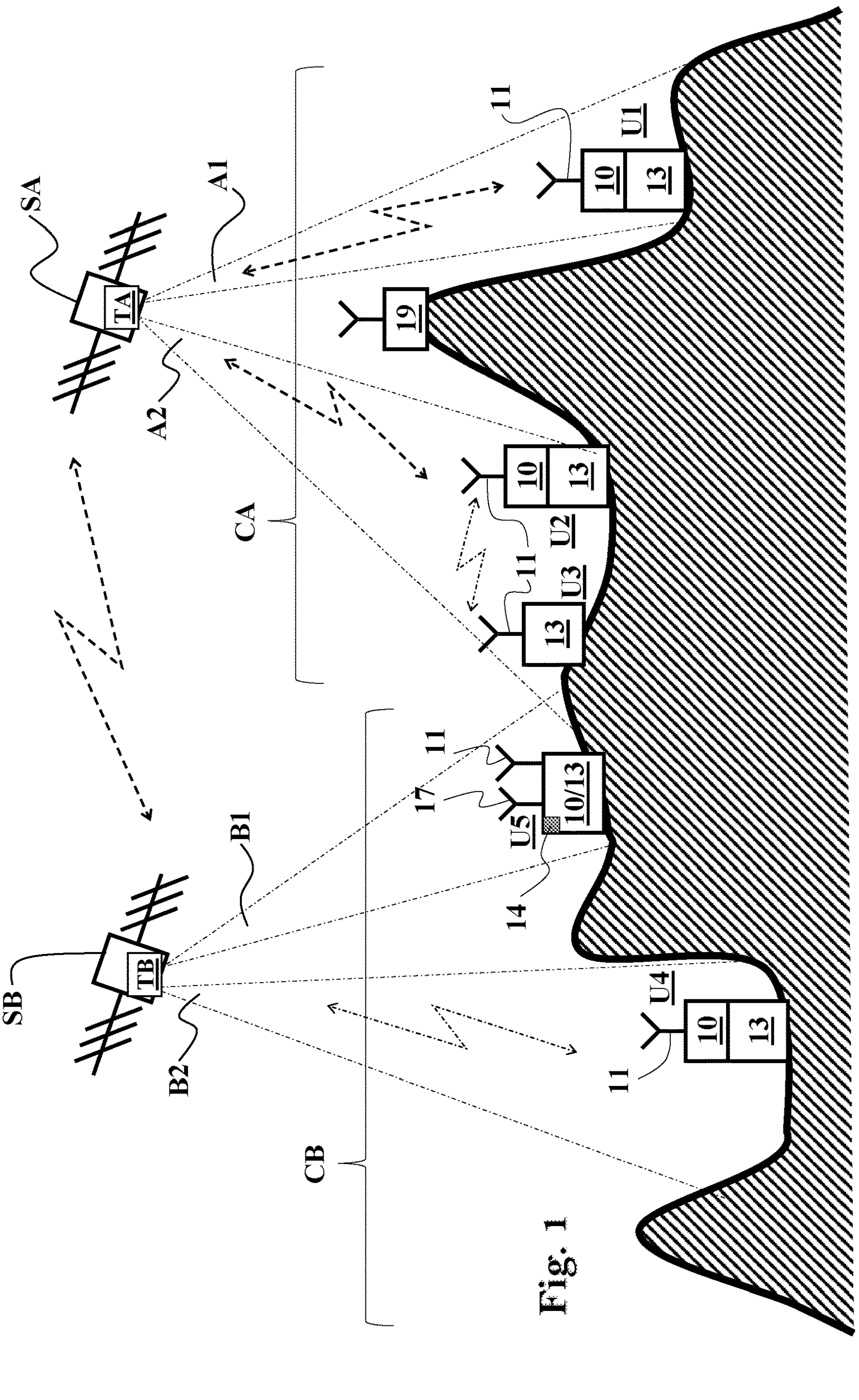
FIG. 1 schematically illustrates a communication system according to some possible embodiments.

One or more specific and/or alternative embodiments of the present disclosure will be described below with reference to the drawings, which are to be considered in all aspects as illustrative only and not restrictive in any manner. It shall be apparent to one skilled in the art that these embodiments may be practiced without such specific details. In an effort to provide a concise description of these embodiments, not all features or details of an actual implementation are described at length in the specification. Elements illustrated in the drawings are not necessarily to scale, or in correct proportional relationships, which are not critical. Emphasis instead being placed upon clearly illustrating the principles of the invention such that persons skilled in the art will be able to make and use the augmented terrestrial communication hereof, once they understand the principles of the subject matter disclosed herein. This invention may be provided in other specific forms and embodiments without departing from the essential characteristics described herein.

The present disclosure provides techniques, system and apparatus, for augmenting conventional terrestrial RF communication systems/infrastructures. A principal feature of embodiments disclosed herein is to convey terrestrial RF communication signals generated by a conventional terrestrial RF transceiver over up/down-links of satellite communication infrastructures. Particularly, in possible embodiments, each conventional terrestrial RF transceiver is adapted to transmit its' terrestrial RF communication signals to other conventional terrestrial RF transceivers operated in the same frequency plan over a satellite uplink communication channel, and to receive terrestrial RF communication signals generated by the other conventional terrestrial RF transceivers over a satellite downlink communication channel.

For this purpose, a specially designed communication converter is coupled in some embodiments to each conventional terrestrial RF transceiver. The communication converter is configured in some embodiments to convert the terrestrial RF communication signals generated by the conventional terrestrial RF transceiver to which it is coupled into satellite uplink communication signals, and to extract from satellite downlink communication signals thereby received terrestrial RF communication signals generated by other conventional terrestrial RF transceivers. A satellite antenna can be thus coupled to the communication converter for transmission of the satellite uplink communication signals, and for the reception of the downlink satellite communication signals.

In optional embodiments the communication converter can be embedded into one or more of the conventional terrestrial RF transceivers, so as to provide modified terrestrial RF transceivers capable of relaying their terrestrial RF communication over uplink satellite communication channel(s). Such modified terrestrial RF transceivers can be equipped in some embodiments with a terrestrial RF communication antenna and/or a satellite communication antenna. A switching circuitry may be also incorporated for selecting which of the antennas is to be used by the modified terrestrial RF transceiver for its communication.

For example, but without being limiting, the switching circuitry can be configured as a manual selector switch allowing the user to change the mode of operation of the modified terrestrial RF transceiver between a regular terrestrial RF communication mode (i.e., the RF terrestrial communication is received and transmitted via the terrestrial RF communication antenna only), or a satellite communication mode in which the RF terrestrial communication is relayed over satellite communication channel(s) (i.e., the RF terrestrial communication is conducted using the satellite communication antenna only).

Optionally, the switching circuitry used in the modified terrestrial RF transceiver is further adapted to provide hybrid communication modes. For example, but without being limiting, the switching circuitry may be configured to allow user's selection of a mode in which the RF terrestrial communication is carried out in both regular terrestrial RF communication and also (e.g., simultaneously) relayed over the satellite communication channel(s) (i.e., both the RF terrestrial and the satellite communication antennas are used), and/or to allow user's selection of a mode in which the transmission of the RF terrestrial signals is carried out regularly (i.e., via the RF terrestrial communication antenna) and the reception of the RF terrestrial signals is carried over the satellite communication channel(s) (i.e., via the satellite communication antenna), and/or to allow user's selection of a mode in which the reception of the RF terrestrial signals is carried out regularly (i.e., via the RF terrestrial communication antenna) and the transmission of the RF terrestrial signals is carried over the satellite communication channel(s) (i.e., via the satellite communication antenna).

Alternatively, or additionally, the switching circuitry is configured to receive control signals/data from the control unit for controllably switching the modified terrestrial RF transceiver between the regular terrestrial RF communication mode, the satellite communication mode, or any of the hybrid communication modes e.g., based on preset settings and/or information indicative of RF communication problems, such as, location/position or other information indicative of interfering geographical and/or weather conditions.

For an overview of several example features, process stages, and principles of the invention, the augmented terrestrial communication examples illustrated schematically and diagrammatically in the figures are primarily intended for LMR communication. These LMR communication systems are shown as one example implementation that demonstrates a number of features, processes, and principles used to provide augmented terrestrial communication, but they are also useful for other applications and can be made in different variations. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in terrestrial communication applications may be suitably employed, and are intended to fall within the scope of this disclosure.

FIG. 1 schematically illustrates techniques of augmenting and securing terrestrial communication according to some possible embodiments. In this non-limiting example, the users U1, U2, U3 and U4, are equipped with conventional terrestrial communication (e.g., LMR) transceivers 13, where each conventional terrestrial transceiver 13 is configured to communicate with other conventional terrestrial transceivers utilizing the same frequency plan. It is assumed in this specific and non-limiting example that the users U1, U2 and U3, are located within the same geographical cell CA, and that their transceivers 13 are using the same frequency plan to establish RF communication therebetween.

While the communication between the users U2 and U3 can be carried out directly between their conventional terrestrial transceivers 13, as long the LOS between their terrestrial antennas (not shown) is maintained, the communication between the transceivers 13 of the users U1 and U2 is conducted via the terrestrial relay/base station 19, due to lack of LOS between their terrestrial antennas. Proper continuous operation of terrestrial relay/base station 19 is thus critical in many situations, and any malfunction thereof may jeopardise critical operations and prevent/postpone timely intervention of lifesaving and/or law enforcement professionals in emergency situations. The communication between the transceivers 13 of the users U1, U2 and U3, is of course susceptible to the geographic/terrain/weather limitations and obstructions, and RF reflections interferences, from which conventional terrestrial communication systems typically suffer.

In order to secure the communication and overcome these obstructions/limitations, a communication converter 10 is coupled in some embodiments to the conventional terrestrial transceivers 13 for augmenting their communication capabilities via satellite communication infrastructures. The communication converter 10 is accordingly configured to receive terrestrial RF communication signals generated by the conventional terrestrial transceiver 13 to which it is coupled, configured according to its frequency plan (i.e., based the geographical cell CA in which the users U1, U2 and U3, reside) convert the terrestrial communication signals into satellite communication signals, and transmit the same to the transponder TA of the satellite SA for relaying the same to all other users that utilize the same frequency plan and a communication converter 10 for augmenting their terrestrial RF communication.

Accordingly, in some embodiments, the communication converter 10 is configured to receive satellite communication signals generated by the transponder(s) TA of one or more satellite(s) SA, convert the same into terrestrial communication signals of the respective terrestrial transceivers 13, and supply the same to the antenna port (e.g., 13*a* in FIGS. 3A and 3B) of the conventional terrestrial transceiver 13 to which it is coupled for reception thereof.

Thus, in the example shown in FIG. 1, the users U1 and U2, utilizing the communication converters 10 according to embodiments disclosed herein to relay their terrestrial communication over the satellite transponder TA, can securely communicate with each other at almost any terrain/weather conditions, and without requiring terrestrial relay(s)/base station(s) 19. It is noted in this respect that if the communication between the conventional terrestrial transceivers 13 of the uses U1 and U2 is encrypted, their communication converters 10 maintain the original encrypted RF communication signals i.e., the encrypted RF communication signals are relayed intact by the communication converters 10, thereby preserving the resilience of the original encrypted RF communication. In addition, the use of satellite uplink/downlink communication channels (e.g., in the 1 to 2 GHz "L band" range) adds electromagnetic resilience to the communication since satellite communication is usually immune/less susceptible to geographic terrain and/or weather conditions interferences.

This way, most of the interferences common to terrestrial communication systems, such as due to reflections, obstructions and/or weather conditions, are substantially reduced or eliminated. In addition, it is usually easier for mobile users to maintain LOS with the satellite SA, as compared to maintaining LOS between terrestrial antennas, and thus many of the LOS related communication interferences/problems are also substantially reduced or eliminated. The user U3, however, will be able to communicate with user U1 only via the terrestrial relay/base station 19, as long their antennas are in LOS without interfering/weather obstacles and within acceptable ranges from each other.

In this specific example the user U1 is shown as residing in a geographical area covered by spot beam A1, while the users U2 and U3 are shown as residing in a geographical area covered by satellite spot beam A2, of the satellite SA. It is however noted that the users U1 and U2 utilizing the communication converter 10 according to possible embodiments hereof can similarly reside within a geographical area covered by the same spot beam of satellite SA (e.g., spot beam A1 or A2) to relay their terrestrial communication signals over the transponder TA.

Also exemplified in FIG. 1, in possible embodiments the communication between the users can be expanded to remote locations allowing user U4 located in a different to geographical cell CB, but utilizing communication converter 10 according to possible embodiments hereof coupled to a conventional terrestrial transceiver 13 configured with the same frequency plan of the geographical cell CA, to communicate with the users U1 and U2. In this non-limiting example, the communication with the conventional terrestrial transceiver 13 of user U4 is relayed by the communication converter 10 via transponder TB of a satellite SB servicing at a portion of the geographical cell CB by its spot beam B2, to the transponder TA of a satellite SA servicing at a portion of the geographical cell CA wherein the conventional terrestrial transceivers 13 of the users U1 and U2 are located. The communication with the conventional terrestrial transceiver 13 of the user U4 may of course require relaying the communication utilizing more (or less) transponders of other satellites (not shown).

FIG. 1 further exemplifies a modified terrestrial RF transceiver 10/13 in which the communication converter 10 of the present application is embedded into the conventional terrestrial transceiver 13 of another user U5. The modified terrestrial RF transceiver 10/13 user U5 can be thus configured to simultaneously, or selectively, use it terrestrial RF communication antenna 17 and the satellite communication antenna coupled to the communication converter 10 embedded therein. In some embodiments a switching circuitry 14 is used for selection of a mode of operation of the modified terrestrial RF transceiver 10/13 of the user U5. In this specific and non-limiting example, the communication of the modified terrestrial RF transceiver 10/13 with the other terrestrial RF transceivers 13 of the users, U1, U2 and/or U4, is carried out via the spot beam B1 of the transponder TB of the satellite SB, but it may be similarly carried out using any other spot beam of the transponders (e.g., TA and/or TB) of the same and/or other satellites (SA and/or SB), depending on the geographical location of the modified terrestrial RF transceiver 10/13.

For example, the switching circuitry 14 can be configured as a manual or digital (e.g., selected via keypad and/or touchscreen buttons) selector switch allowing the user to change the mode of operation of the modified terrestrial RF transceiver 10/13 between a regular terrestrial RF communication mode (i.e., the RF terrestrial communication is regularly carried out via the terrestrial RF communication antenna only), or a satellite communication mode in which the RF terrestrial communication is relayed over satellite communication channel(s) (i.e., the RF terrestrial communication is conducted over the satellite communication antenna only).

Optionally, the switching circuitry 14 can be further adapted to provide hybrid communication modes e.g., to allow a mode in which the RF terrestrial communication is carried out in both regular terrestrial RF communication and also (e.g., simultaneously) relayed over the satellite communication channel(s) (i.e., both the RF terrestrial and the satellite communication antennas are used), and/or a mode in which the transmission of the RF terrestrial signals is carried out regularly (i.e., via the RF terrestrial communication antenna) and the reception of the RF terrestrial signals is carried over the satellite communication channel(s) (i.e., via the satellite communication antenna), and/or a mode in which the reception of the RF terrestrial signals is carried out regularly (i.e., via the RF terrestrial communication antenna) and the transmission of the RF terrestrial signals is carried over the satellite communication channel(s) (i.e., via the satellite communication antenna).

Alternatively, or additionally, the switching circuitry 14 is a controllable circuitry configured to change the mode of operation of the modified terrestrial RF transceiver 10/13 between the regular terrestrial RF communication mode, the satellite communication mode, and/or any of the hybrid communication modes, based on control signals/data received from a control unit (18 in FIGS. 4A to 4C) of the.

Figures 2A, 2B, 2C:
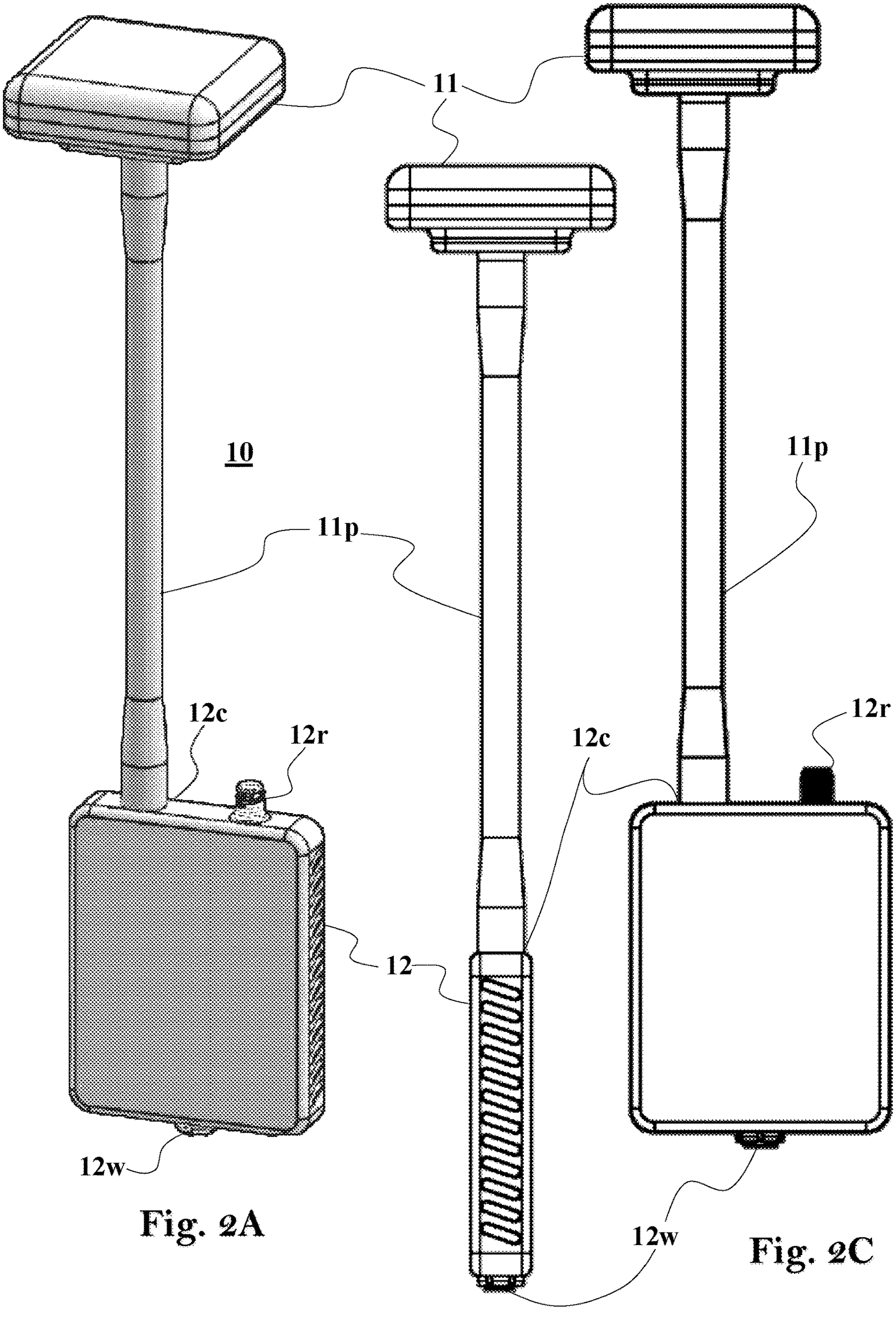
FIG. 2A is a schematic perspective view of a communication converter device according to some possible embodiments.
FIG. 2B is a schematic side view of a communication converter device according to some possible embodiments.
FIG. 2C is a schematic front view of a communication converter device according to some possible embodiments.

FIGS. 2A to 2C schematically illustrate the communication converter 10 and its satellite antenna 11 according to some possible embodiments. The communication converter 10 in this example comprises a housing 12 comprising a power inlet 12*w* configured for coupling to a power source (e.g., battery), RF signal port 12*r* configured for coupling RF terrestrial communication signals thereto, and an antenna port 12*c* configured for coupling a satellite antenna 11 thereto. As also seen, in possible embodiments the satellite antenna 11 is coupled to the communication converter 10 via an extension pole 11*p* configured to elevate the satellite antenna 11 a defined height (e.g., 5 to 30 cm) above the housing 12.

The communication converter 10 is configured to support most of the terrestrial RF transceivers 13 commercially available in the markets nowadays. In some embodiments the communication converter 10 is configured to support terrestrial frequency plans in the 50 to 950 MHz frequency range.

Optionally, but in some embodiments preferably, the satellite antenna 11 is a type planar (e.g., printed circuit board-PCB) passive antenna. Optionally, the satellite antenna 11 is a type of right-hand circular polarity (RHCP) antenna e.g., for communicating via INMARSAT satellites The satellite antenna 11 can be accordingly mounted such that its planar surface area is substantially parallel to the ground surface (i.e., facing the sky). As seen, in possible embodiments, the satellite antenna 11 is centered about the extension pole 11*p*.

Figures 3A, 3B:
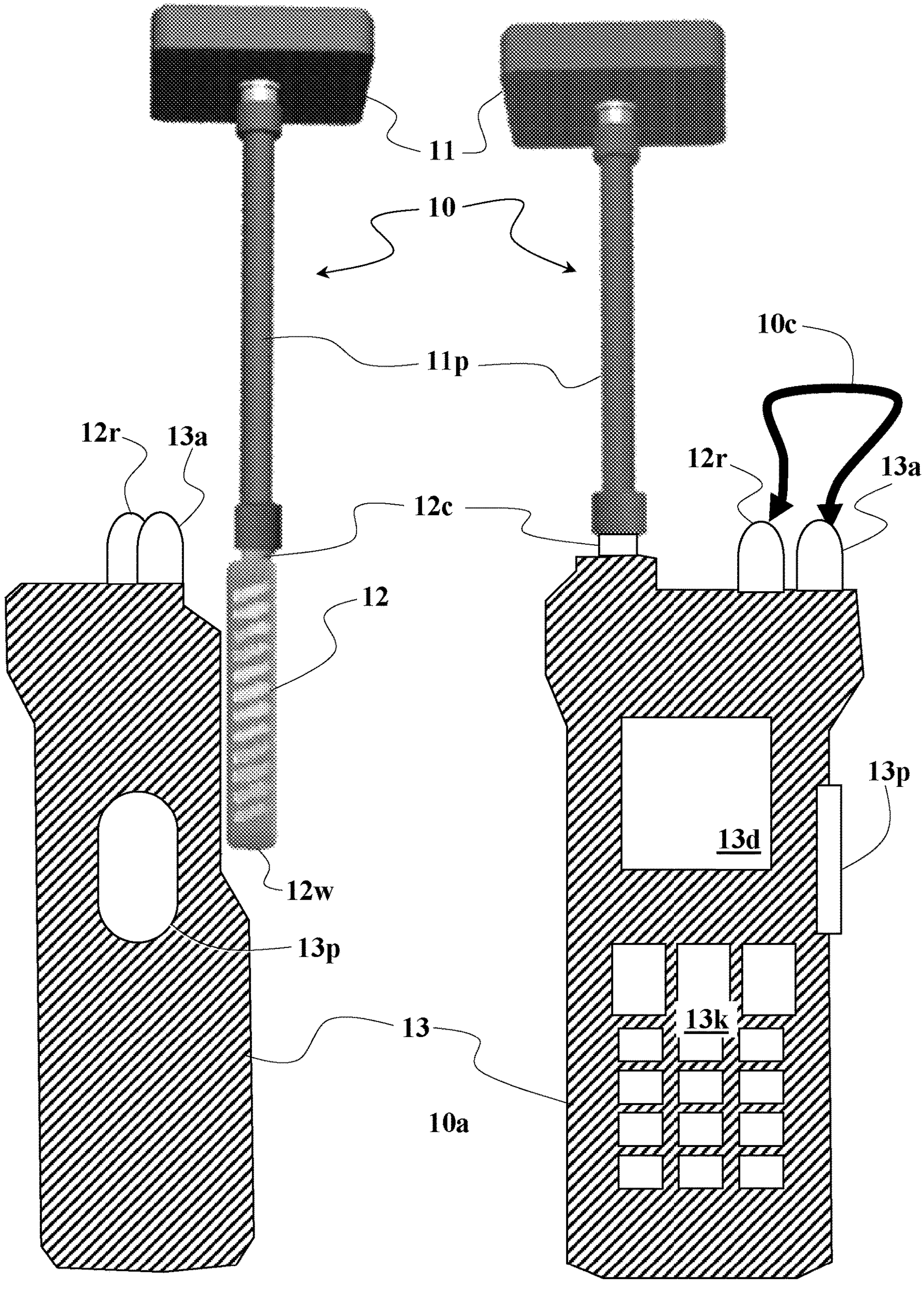
FIG. 3A exemplifies coupling of the communication converter to a LMR transceiver according to some possible embodiments.
FIG. 3B exemplifies coupling of the communication converter to a LMR transceiver according to some possible embodiments.

FIGS. 3A and 3B schematically illustrate the communication converter 10 coupled to a terrestrial transceiver 13 e.g., a PTT (13*p*) LMR device, according to some possible embodiments. As seen in FIG. 3A, in this specific and non-limiting example the communication converter 10 is configured to be compactly received and supported in an indentation formed above the battery of the terrestrial transceiver 13. Though the satellite antenna 11 is shown coupled to the antenna port 12*c* via the extension pole 11*p*, it may be alternatively coupled directly to the antenna port 12*c* i.e., without the extension pole 11*p*.

As seen in FIG. 3B, the terrestrial transceiver 13 may have a display (e.g., liquid-crystal-display-LCD device) 13*d* for showing operational and/or other text information, and/or a keypad 13*k* for input of operational data and/or other text information. A waveguiding element 10*c*, such as coax cable, can be used for coupling between the antenna port 13*a* of the terrestrial transceiver 13 to the RF signal port 12*r* of the communication converter 10.

Figure 4A:
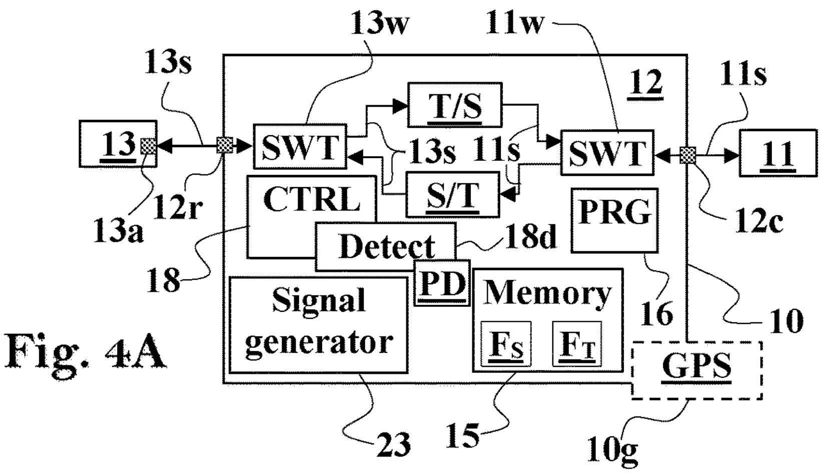
FIG. 4A is a general block diagram of the communication converter according to some possible embodiments.

Referring now to FIG. 4A, generally exemplifying connectivity and operation of the communication converter 10 according to some possible embodiments. The communication converter 10 is configured to receive and transmit via its RF signal port 12*r* the terrestrial communication signals 13*s*, and to receive and transmit via its antenna port 12*c* the satellite communication signals 11*s*. A switch device 13*w* can be used to controllably receive the terrestrial communication signals 13*s* from the RF signal port 12*r* and feed the same to a terrestrial-to-satellite communication converter T/S of the communication converter 10, or to receive terrestrial communication signals 13*s* generated by a satellite-to-terrestrial communication converter S/T of the communication converter 10 and feed the same to the RF signal port 12*r*. An additional switch device 11*w* can be used to controllably receive the satellite communication signals 11*s* from the antenna port 12*c* and feed the same to the satellite-to-terrestrial communication converter S/T, or to receive satellite communication signals 11*s* generated by the terrestrial-to-satellite communication converter T/S and feed the same to the antenna port 12*c*.

One or more signal generators (synthesizer) 23 can be used for operating the terrestrial-to-satellite communication converter T/S and the satellite-to-terrestrial communication converter S/T, as will explained in detail hereinbelow. In possible embodiments a single signal generator 23 is used for selectively and controllably generating a transmit (Tx) local oscillator signal having a desired satellite signal modulation frequency $F_S$ (e.g., in accordance with an uplink spot beam satellite communication frequency of a satellite used for augmenting the terrestrial communication) for the terrestrial-to-satellite communication converter T/S, or a receipt (Rx) local oscillator signal having a desired terrestrial signal demodulation frequency $F_T$ (e.g., in accordance with a downlink spot beam satellite communication frequency of a satellite used for augmenting the terrestrial communication) for the satellite-to-terrestrial communication converter S/T.

The communication converter 10 comprises in some embodiments a control unit 18 (e.g., utilizing one or more processors) and memories 15, configured and operable for storing programs code and/or operational data, used for operation of different functions thereof. For example, the memory can be used for storing the satellite signal modulation frequency $F_S$ and/or the terrestrial signal demodulation frequency $F_T$, and the control unit 18 can be configured to determine if the communication converter 10 is required for operation in S/T or T/S mode, and accordingly instruct the signal generator 23 for the generation of the local oscillator signal of the satellite signal modulation frequency $F_S$, or the terrestrial signal demodulation frequency $F_T$ stored in the memory 15, and also set accordingly the states of the switches 13*w* and 11*w*.

For this purpose, the communication converter 10 comprises in some embodiments a detection module 18*d* configured to monitor the RF signal port 12*r* and/or the antenna port 12*c*, and set the communication converter 10 into the S/T or T/S mode of operation accordingly. Particularly, the detection module 18*d* can be configured to issue indications for setting the communication converter 10 into its T/S mode upon detection of the terrestrial communication signals 13*s* at the RF signal port 12*r*, or into its S/T mode upon detection of the satellite communication signals 11*s* at the antenna port 12*c*. The control unit 18 can be accordingly configured to: (i) upon receiving an T/S mode indication from the detection module 18*d* select the terrestrial signal modulation frequency $F_S$ for use by the signal generator 19, and set the switches 13$w$ and 11$w$ to deliver communication signals between the RF signal port 12$r$ and the antenna port 12$c$ via the T/S unit; or (ii) upon receiving an S/T mode indication from the detection module 18$d$ select the satellite signal demodulation frequency $F_T$ for use by the signal generator 19, and set the switches 13$w$ and 11$w$ to deliver communication signals between the antenna port 12$c$ and the RF signal port 12$r$ via the S/T unit. The detection module 18$d$ can be implemented by software code executed by the control unit 18, as a separate hardware unit, or as a combination of software code executed by the control unit 18 and separate hardware components.

Optionally, but in some embodiments preferably, the detection module 18$d$ utilizes a power detection (PD) circuitry configured to sample the power of the signal at the RF signal port 12$r$ and based thereon determine if the communication converter 10 should be set into the T/S or S/T mode e.g., the sampled signal power can be rectified (e.g., utilizing one or more diodes—not shown) and/or compared to a predefined threshold value (e.g., utilizing a comparator—not shown) to determine if the sampled signal power is indicative of receipt of the terrestrial RF communication signals from the terrestrial transceiver 13.

Figure 4D:
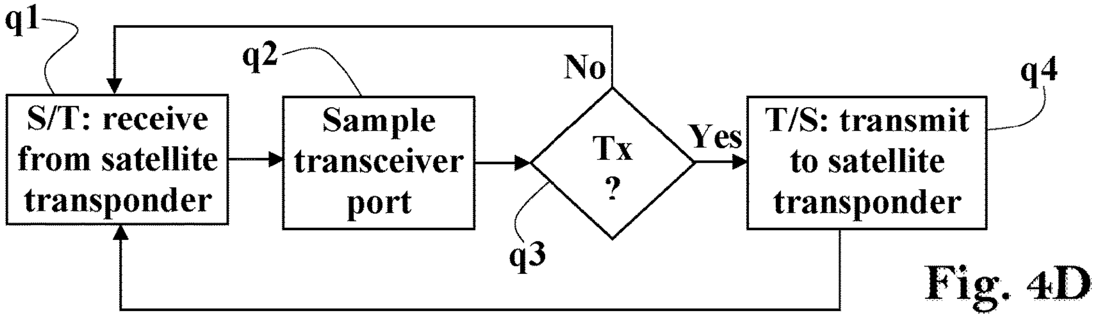
FIG. 4D is a flowchart exemplifying switching the communication converter between the S/T and T/S modes.

Referring now to FIG. 4D, in some embodiments the communication converter (10) is set by default into the S/T mode (q1) for receipt of the satellite communication signals received by the satellite antenna (11), extraction of the terrestrial RF signals therefrom, and conveying the same to the terrestrial transceiver (13). The RF signal port 12$r$ is continuously/periodically sampled (q2) by the detection module (18$d$), and if the sampled signals are indicative (q3) of terrestrial transmission power (e.g., greater than 0.5 Watt) and/or frequency (e.g., according to the frequency plan of the terrestrial transceiver) the state of the communication converter (10) is changed into the T/S mode to transmit (q4) the terrestrial RF signals from the terrestrial transceiver (13) to the satellite transponder over the satellite uplink channel.

The state of the communication converter (10) is changed back into the S/T mode when the sampled signals are not indicative (q3) of terrestrial transmission power and/or frequency at the RF signal port 12$r$, or after completing the transmission (q4) of the terrestrial RF signals over the satellite uplink channel.

In some embodiments the communication converter 10 comprises a programing module 16 configured for setting desired values for the satellite signal modulation communication frequency $F_S$ and/or the terrestrial signal demodulation frequency $F_T$ in the memory 15. The communication converter 10 is configured in some embodiment to limit the permission to use the programing module 16 for the setting of the satellite/terrestrial signal modulation/demodulation frequency $F_S/F_T$ to only authorized operators/technicians. This way, the communication converter 10 can be preset once by an authorized officer for use in compliance with the frequency plan of a specific geographic area intended for use of the respective conventional terrestrial transceiver 13, and for communication with specific one or more satellites which spot beams cover at least some portion of that specific geographic area.

In other possible embodiments the memory 15 may be configured to store a plurality of satellite/terrestrial signal modulation/demodulation $F_S/F_T$ frequency pairs, where each satellite/terrestrial signal modulation/demodulation $F_S/F_T$ frequency pair is associated with a certain geographic area. The control unit 18 can be accordingly configured to select and use a suitable satellite/terrestrial signal modulation/demodulation $F_S/F_T$ frequency pair from the plurality of satellite/terrestrial signal modulation/demodulation $F_S/F_T$ frequency pairs stored in the memory 15 for use by the communication converter 10. Optionally, a positioning module (e.g., of a global-positioning-system-GPS) is provided in the communication converter 10, or external thereto e.g., in the terrestrial transceiver 13, and the control unit 18 can be accordingly configured to select the suitable satellite/terrestrial signal modulation/demodulation communication $F_S/F_T$ frequency pair based on positioning data generated by the positioning module 10$g$.

Figure 4B:
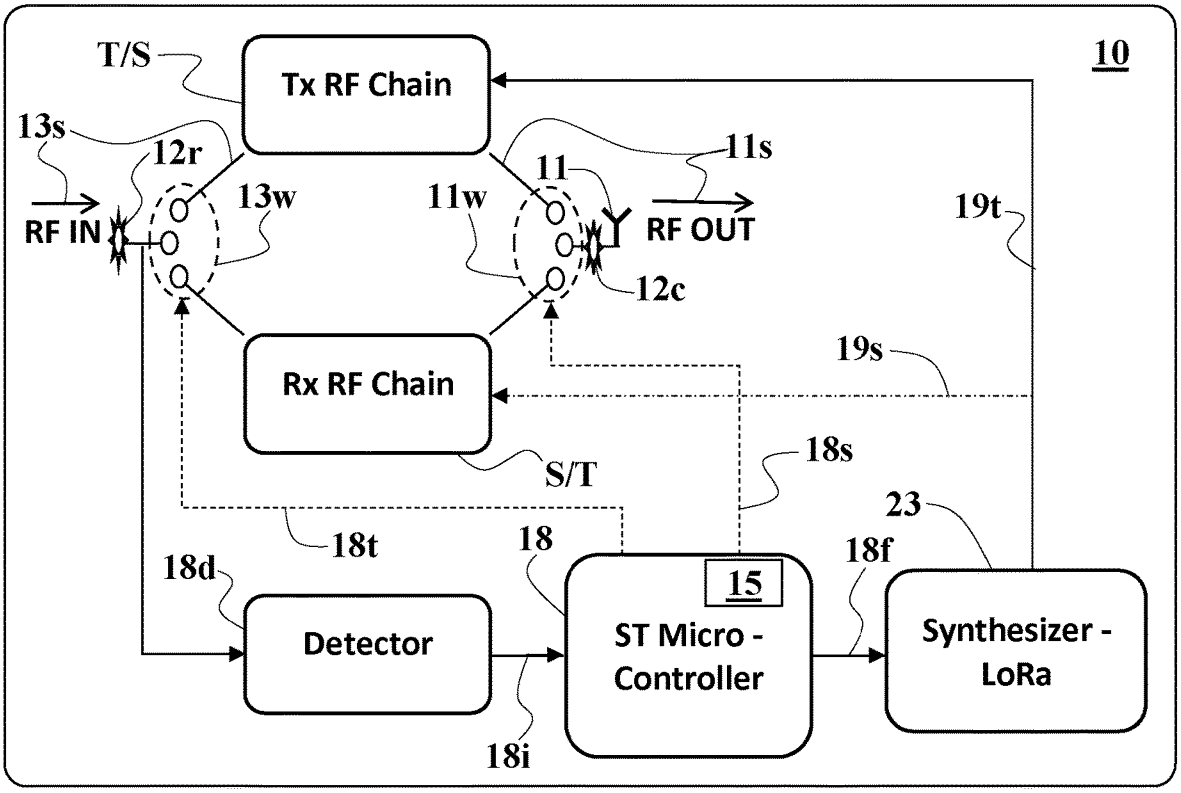
FIG. 4B is a functional block diagram of the communication converter according to some possible embodiments.

FIG. 4B shows a schematic illustration exemplifying the T/S operation mode of the communication converter 10. Upon detection of the terrestrial communication signals 13$s$ at the RF signal port 12$r$ it issues a corresponding indication 18$i$ used by the control unit 18 to switch the communication converter 10 into the T/S mode. Correspondingly, the control unit (e.g., ST Micro-Controller) 18 generates instructions 18$f$ for the signal generator (e.g., long-range—LoRa synthesizer) 23 to generate the local oscillator signal in the terrestrial modulation frequency $F_S$, which is thereby supplied to the T/S unit (Tx RF Chain). The control unit 18 also generates control data/signals 18$t$ to set the state of the switch 13$w$ for delivery of the terrestrial communication signals 13$s$ from the RF signal port 12$r$ to the T/S unit, and control signals 18$s$ to set the state of the switch 11$w$ for delivery of the satellite communication signals 11$s$ generated by the T/S unit to the antenna port 12$c$. In this state the communication converter 10 converts the terrestrial communication signals 13$s$ received via its RF signal port 12$r$ into corresponding satellite communication signals 11$s$ for transmission via the satellite antenna 11.

In a similar fashion, the detection module 18 can be configured to detect the satellite communication signals 11$s$ at the antenna port 12$c$, and to correspondingly issue a corresponding indication 18$i$ used by the control unit 18 to switch into the S/T mode. Correspondingly, the control unit 18 generate instructions 18$f$ for the signal generator 19 to generate the local oscillator signal in the satellite signal demodulation $F_T$ frequency, which is thereby supplied to the S/T unit (Rx RF Chain). The control unit 18 also generates control signals 18$s$ to set the state of the switch 11$w$ for delivery of the satellite communication signals 11$s$ from the the antenna port 12$c$ to the S/T unit, and control signals 18$t$ to set the state of the switch 13$w$ for delivery of the terrestrial communication signals 13$s$ generated by the S/T unit to the RF signal port 12$r$. In this state the communication converter 10 converts the satellite communication signals 11$s$ received via its antenna port 12$c$ into terrestrial communication signals 13$s$ for transmission to the conventional terrestrial transceiver 13 via its RF signal port 12$r$.

Figure 4C:
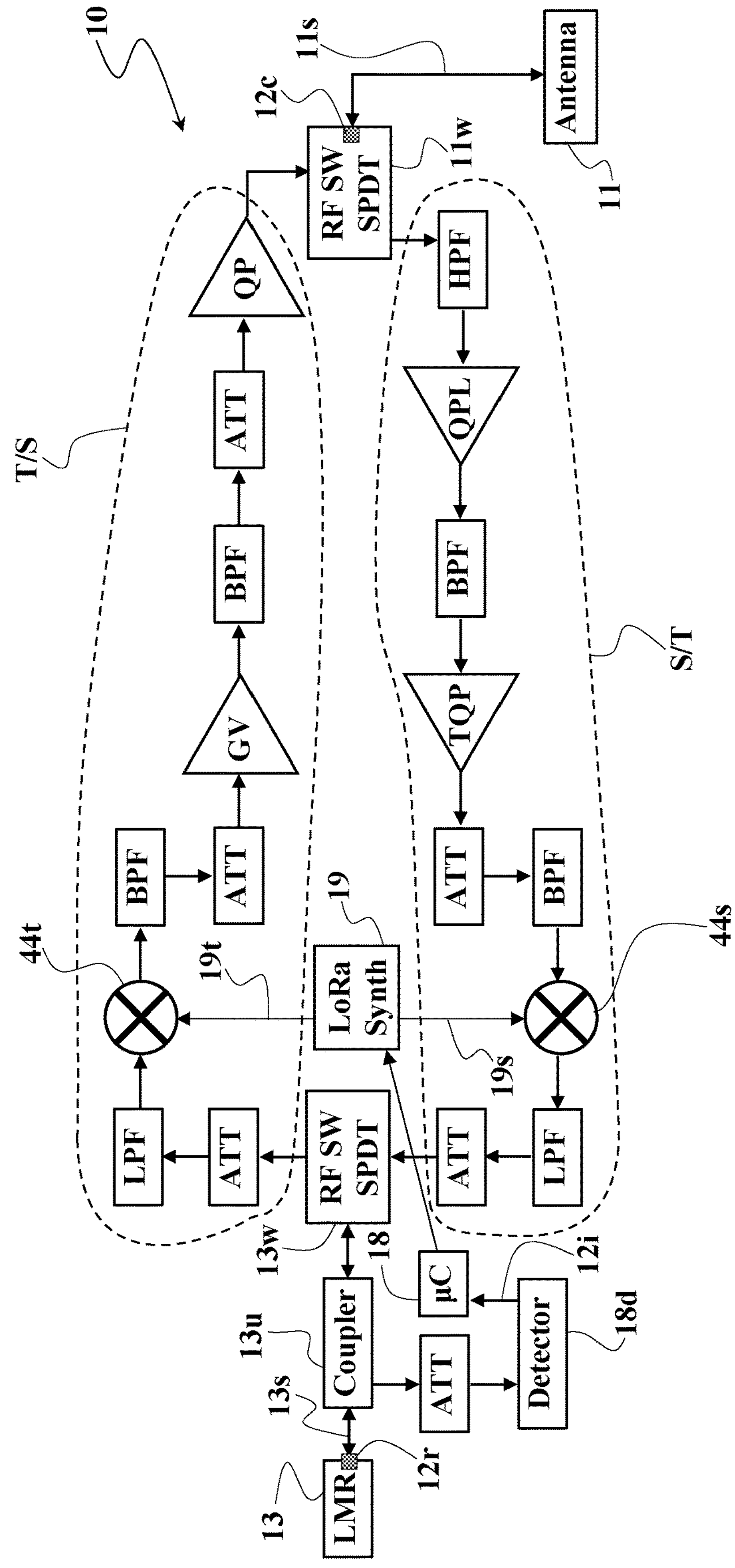
FIG. 4C shows with more detail components of the communication converter.

FIG. 4C is a block diagram showing with more details an implementation of the communication converter 10 according to some possible embodiments. In this non-limiting example the terrestrial communication signals 13$s$ received via the RF signal port 12$r$ are passed through an RF coupler 13$u$ via a first terminal thereof to a second terminal thereof configured to output a portion of the terrestrial communication signals 13$s$ to the switch (e.g., RF SW single-pole-double-throw—SPDT) 13$w$, and to a third terminal thereof configured to output another portion of the terrestrial communication signals 13$s$ to the detector module 18$d$. Optionally, but in some embodiments preferably, the portion of the terrestrial communication signal 13$s$ conveyed from the third terminal of the coupler 13$u$ to the detector module 18$d$ is passed through an adjustable attenuation unit (ATT). Based on the portion of the terrestrial communication signals 13$s$ thereby received, the detector module 18$d$ issues the mode indication 12*i* used by the control unit (e.g., microcontroller) 18 in setting the communication converter 10 into its T/S mode or S/T mode.

Corresponding to a T/S mode indication 12*i* from the detection module 18*d*, the control unit 18 sets the signal generator 19 to generate the terrestrial signal modulation frequency $F_S$, sets the switch 13*w* to convey the portion of the terrestrial communication signal 13*s* from the second terminal of the coupler 13*u* to the T/S unit, and sets the switch 11*w* to convey the satellite communication signals generated by the T/S unit to antenna port 12*c* of the satellite antenna 11. Accordingly, in the T/S mode, the portion of the terrestrial communication signal 13*s* obtained on the second terminal of the coupler 13*u* is conveyed by the switch 13*w* to a terrestrial signal mixer 44*t* for modulating the local oscillator signal 19*t* generated by the signal generator 19. As exemplified in FIG. 4C, the portion of the terrestrial communication signal 13*s* conveyed by the switch 13*w* to the terrestrial signal mixer 44*t* is passed through a low-pass-filter LPF of the T/S unit configured to remove therefrom high frequency signal components. Optionally, but in some embodiments preferably, the signal conveyed to the LPF of the T/S unit is passed through an adjustable attenuator unit ATT.

The modulated signal generated by the terrestrial signal mixer 44*t* can be then processed by one or more filters and/or amplification stages, for transmission via the satellite antenna 11. For example, in possible embodiments the modulated signal from the terrestrial signal mixer 44*t* is passed through a first band-pass-filter BPF of the T/S unit configured to remove low and/or high frequency components introduced by the terrestrial signal mixer 44*t* (e.g., to remove the lower-side-band—LSB and/or the upper-side-band—USB). Optionally, but in some embodiments preferably, the signal conveyed to the first BPF of the T/S unit, is passed through an adjustable attenuator unit ATT. The filtered signal from the first BPF of the T/S unit can be than amplified e.g., by RF gain-voltage—GV amplifier. The amplified signal from the GV amplifier can be filtered by a second BPF of the T/S unit configured to remove low and/or high frequency components introduced by the GV amplifier. Finally, the processed modulated signal can be amplified for transmission by a power amplifier (e.g., QP amplifier).

Corresponding to a S/T mode indication 12*i* from the detection module 18*d*, the control unit 18 sets the signal generator 19 to generate the satellite signal demodulation frequency $F_T$, sets the switch 11*w* to convey the satellite communication signal 11*s* from the antenna port 12*c* to the S/T unit, and sets the switch 13*w* to convey the terrestrial communication signals generated by the S/T unit to the second terminal of the coupler 13*u*. Accordingly, in the S/T mode, the satellite communication signal 11*s* is conveyed by the switch 11*w* to a satellite signal mixer 44*s* for demodulation by the local oscillator signal 19*s* generated by the signal generator 19. The satellite signal 11*s* from the switch 11*w* can be processed by one or more filters and/or amplification stages, before the demodulation by the satellite signal mixer 44*s*.

For example, as exemplified in FIG. 4C, in some embodiments the satellite communication signal 11*s* conveyed by the switch 11*w* to the satellite signal mixer 44*s* is passed through a high-pass-filter HPF configured to remove therefrom low frequency signal components (e.g., noise). The filtered signal from the HPF is amplified by a power amplifier (e.g., QPL—low noise amplifier). The amplified signal from the QPL amplifier can be filtered by a first BPF of the S/T unit to remove low and/or high frequency components introduced thereinto by the QPL amplifier. The filtered signal form the first BPF of the S/T unit can be further amplified by a power amplifier (e.g., TQP reception amplifier). In possible embodiments the amplified signal from the TQP amplifier is passed through a second BPF of the S/T unit to remove low and/or high frequency components introduced thereinto by the TOP amplifier. Optionally, but in some embodiments preferably, the amplified signal from the TOP amplifier is passed through an adjustable attenuator unit ATT before it is fed into the second BPF of the S/T unit.

In possible embodiments the demodulated signal from the satellite signal mixer 44*s* is passed through a low-pass-filter LPF of the S/T unit configured to remove low frequency components introduced by the satellite signal mixer 44*s* (e.g., to remove the USB), before it is fed into the switch 13*w*. Optionally, but in some embodiments preferably, the signal conveyed to the switch 13*w* from the LPF of the S/T unit is passed through an adjustable attenuator unit ATT. The filtered demodulated signal from the switch 13*w* is fed into the second terminal of the coupler 13*u*, which outputs a portion thereof to the detection module 18*d* (e.g., via the ATT), and outputs a portion thereof to the terrestrial transceiver 13 via the RF signal port 12*r*.

It is noted that the various adjustable attenuators ATTs are optionally used in the communication converter 10 for coordinating the power levels conveyed to the different (e.g., amplification) stages in the T/S and the S/T chains. This way, the communication converter 10 can be controllably switched/adapted for use with different types of conventional terrestrial RF transceivers (e.g., such manufactured by Motorola, Leonardo, Tetron, or suchlike), which typically have different working power levels. However, if the communication converter 10 is used with a specific predefined terrestrial RF transceiver having a known fixed operational power scheme, some or all of the adjustable attenuator units ATT can be removed from communication converter 10, and/or replaced by fixed suitable attenuator units (not shown).

Figure 5:
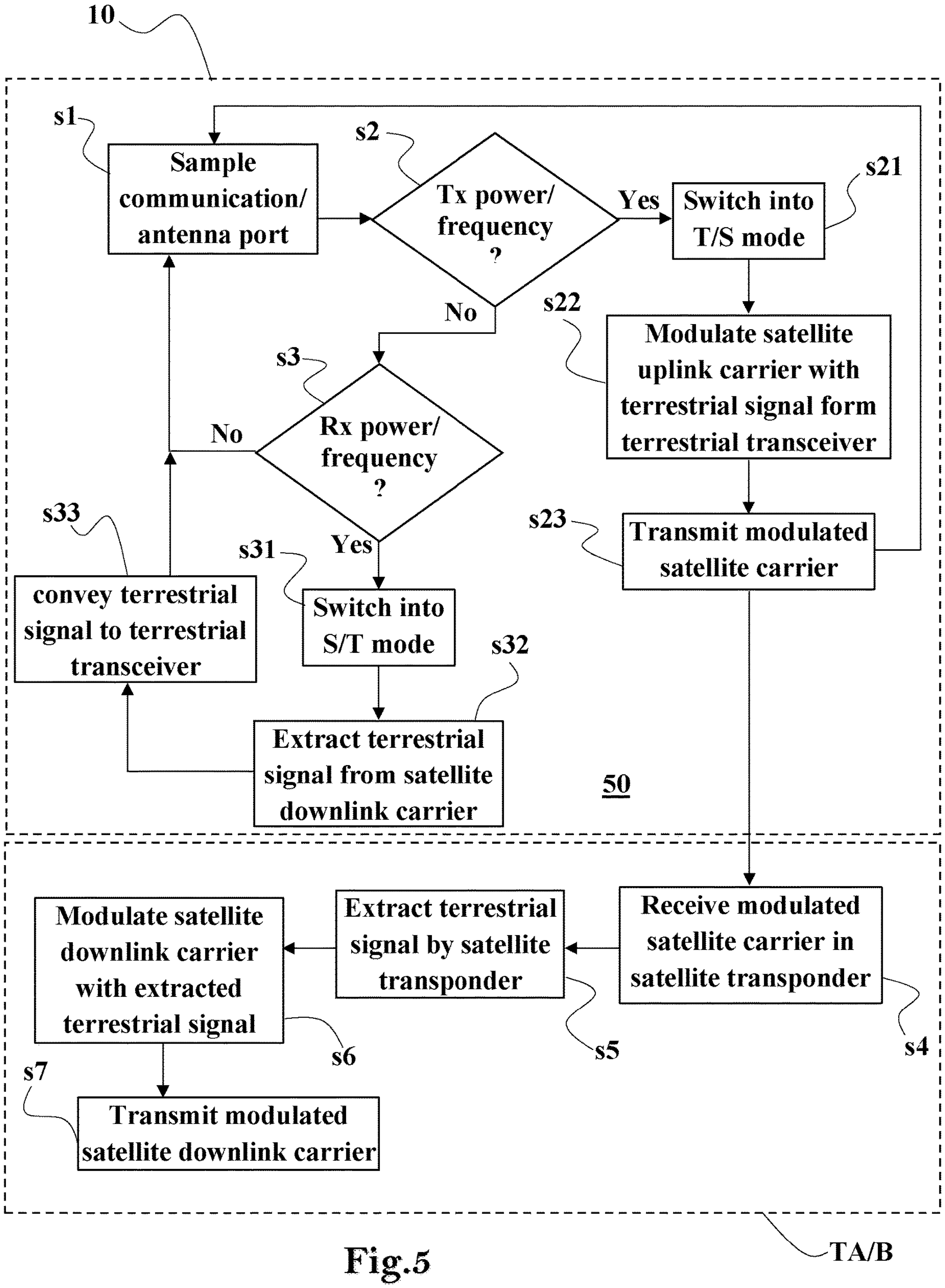
FIG. 5 is a flowchart schematically illustrating augmentation of terrestrial communication equipment/infrastructures according to some possible embodiments.

FIG. 5 is a flowchart 50 schematically illustrating augmentation of terrestrial communication equipment/infrastructures according to some possible embodiments. The process 50 can start in the sampling (s1) of signals at the RF signal port (12*r*) and/or at the satellite antenna port (12*c*) of the communication converter 10. If the sampled signals are indicative (s2) of transmission (Tx) of signals having terrestrial frequency and/or power (e.g., greater than 0.5 Watt) at the RF signal port (12*r*), then the communication converter 10 is switched (s21) into the T/S mode. Otherwise, it is checked if the sampled signals are indicative (s3) of receipt (Rx) of satellite frequency and/or power (e.g., smaller than 0.5 Watt) at the satellite antenna port (12*c*). In the T/S mode (s21), the communication converter 10 uses the terrestrial RF signals received from the terrestrial transceiver (13) via the RF signal port (12*r*) to modulate (s22) a satellite uplink communication carrier, and thereafter transmits (s23) to a satellite transponder (e.g., TA or TB), the modulated satellite uplink communication carrier.

If it is determined that the sampled signals are indicative (s3) of receipt (Rx) of signals having satellite communication frequency and/or power at the satellite antenna port (12*c*), then the communication converter 10 is switched (s31) into the S/T mode. In the S/T mode (s31), the communication converter 10 extracts (s32) the terrestrial RF signals from the satellite downlink communication signals thereby received via its satellite antenna port (12*c*) and conveys (s33) the extracted terrestrial RF signals to the terrestrial transceiver (13) via the RF signal port (12*r*). The sampling (s1) and the mode determining (s2 and s3) stages of the process 50 can be repeated after conveying (s33) the extracted terrestrial RF signals to the terrestrial transceiver (13), or if the sampled signals are not indicative (s3) of receipt (Rx) of signals having satellite communication frequency and/or power at the satellite antenna port (12*c*).

As also seen in FIG. 5, when the modulated uplink satellite communication is received (s4) at the satellite transponder, the satellite transponder extracts (s5) from the received modulated uplink satellite communication signals the terrestrial RF signals, which are then thereby used to modulate (s6) a downlink satellite carrier. The satellite transponder then transmits (s7) the modulated satellite downlink carrier to the communication converters 10.

Relative terms such as "lower," "upper," "horizontal," "vertical," "above," "below," "up," "down," "top" and "bottom", as well as derivatives thereof (e.g., "horizontally," "downwardly," "upwardly," etc.), and similar adjectives in relation to orientation of the described elements/components refer to the manner in which the illustrations are positioned on the paper, not as any limitation to the orientations in which these elements/components can be used in actual applications.

It should also be understood that throughout this disclosure, where a process or method is shown or described, the steps/acts of the method may be performed in any order and/or simultaneously, and/or with other steps/acts not-illustrated/described herein, unless it is clear from the context that one step depends on another being performed first. In possible embodiments not all of the illustrated/described steps/acts are required to carry out the method.

Those of skill in the art would appreciate that items such as the various illustrative blocks, modules, elements, components, methods, operations, steps, and algorithms described herein may be implemented as hardware (e.g., application specific integrated circuits-ASICs, field-programmable gated arrays-FPGAs) or a combination of hardware and computer software. To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

As described hereinabove and shown in the associated figures, the present invention provides communication transforming tools usable for augmenting terrestrial RF communication systems/infrastructures, and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A communication converter comprising:

a RF signal port for coupling said communication converter to a terrestrial RF transceiver;

an antenna port for coupling said communication converter to a satellite antenna;

a terrestrial-to-satellite (T/S) conversion unit configured to receive via said RF signal port terrestrial RF communication signals generated by said terrestrial RF transceiver and convert them into uplink satellite communication signals;

a satellite-to-terrestrial (S/T) conversion unit configured to receive via said antenna port downlink satellite communication signals received by said satellite antenna and extract therefrom terrestrial RF communication signals thereby carried;

one or more signal generators configured to generate local oscillator signals for the conversion of the terrestrial RF communication signals into the uplink satellite communication signals, and for the extraction of the terrestrial RF communication signals from the downlink satellite communication signals, and wherein said terrestrial-to-satellite (T/S) conversion unit is configured to modulate a local oscillator signal generated by the one or more signal generators with the terrestrial RF communication signals received by said communication converter via the RF signal port, and wherein said satellite-to-terrestrial (S/T) conversion unit is configured to use a local oscillator signal generated by the one or more signal generators to extract the terrestrial RF communication signals from the downlink satellite communication signals received by said communication converter; and a detection unit configured to detect at least the reception of the terrestrial RF communication signals at said RE signal port and/or the reception of downlink satellite communication signals at said antenna port, and generate based thereon data/signals for setting mode of operation of said communication converter into a –T/S mode or a S/T mode.

2. The communication converter according to claim 1 comprising a first switch device for coupling said communication converter to the RF signal port, said first switch device configured to controllably convey to the T/S conversion unit terrestrial RF communication signals received via said RF signal port, or convey to said RF signal port terrestrial RF communication signals extracted by the S/T conversion unit.

3. The communication converter according to claim 1 comprising a second switch device for coupling said communication converter to the antenna port, said second switch device configured to controllably convey to the S/T conversion unit downlink satellite communication signals received via said antenna port, or to convey to said antenna port uplink satellite communication signals generated by the T/S conversion unit.

4. The communication converter according to any-ene-of-claim 1 comprising: a first switch device for coupling said communication converter to the RF signal port, said first switch device configured to controllably convey to the T/S conversion unit terrestrial RF communication signals received via said RF signal port, or convey to said RF signal port terrestrial RF communication signals extracted by the S/T conversion at a second switch device for coupling said communication converter to the antenna pc said second switch device configured to controllably convey to the S/T conversion unit downlink satellite communication signals received via said antenna port, or to convey to said antenna port uplink satellite communication signals generated by the T/S conversion unit; and a control unit configured to generate control data/signals to set said communication converter into the T/S or S/T modes of operation, and for changing the states of the first and second switch devices accordingly, based on the data/signals generated by the detection unit.

5. The communication converter according to claim 1 comprising one or more memories for at least one of the following: storing predefined conversion and extraction frequencies, storing a plurality of frequency pairs of predefined conversion and extraction frequencies for selection of one of said plurality of frequency pairs for based at least in part on a geographical location of the terrestrial RF transceiver to which said communication converter is coupled.

6. A communication device comprising a terrestrial RF transceiver, a communication converter according to claim 1 configured to receive via its RF signal port terrestrial RF communication signals generated by said terrestrial RF transceiver, and a satellite antenna coupled to the antenna port of said communication converter and configured to transmit satellite communication signals generated by said communication converter.

7. The communication device according to claim 6 comprising an extension pole configured to connect between the satellite antenna and the antenna port of the communication converter so as to elevate said satellite antenna a predefined distance from said communication converter.

8. The communication device according to claim 6 wherein the satellite antenna is a type of printed circuit planar passive antenna.

9. A communication system comprising at least one satellite transponder and two or more communication devices according to claim 7 for relaying terrestrial RF communication therebetween over said at least one satellite transponder.

10. The communication system according to claim 9 wherein the at least one satellite transponder is mounted on at least one geostationary satellite.

11. The communication system according to claim 9 wherein the at least two communication devices are associated with a same spot beam of said at least one satellite transponder, and/or associated with a same frequency plan.

12. The communication system according to claim 11 wherein at least one of the at least two communication devices is associated with either another spot beam of said at least one satellite transponder or with a spot beam of another satellite transponder that is in satellite communication with said at least one satellite transponder.

* * * * *